W. A. Wood.
Harvester Cutter.
No 1460 Reissued April 21. 1863.
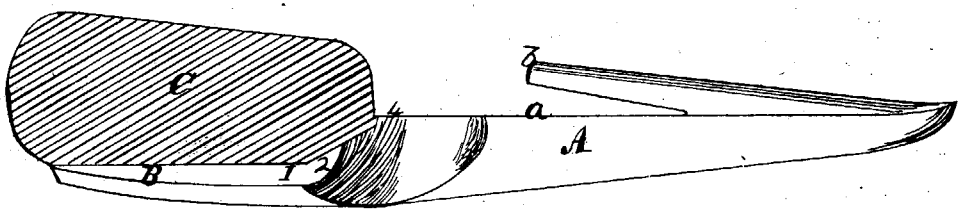
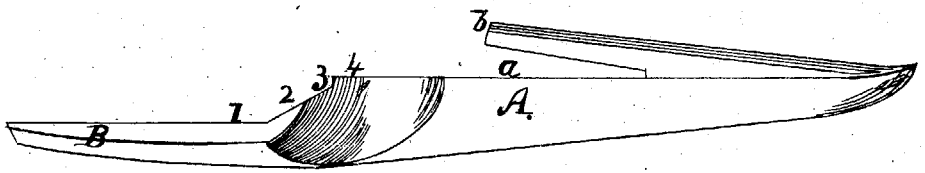
Witnesses.
Haver. Fendrich.
P. E. Wilson.
Walter A. Wood.
By atty A. B. Stoughton.

UNITED STATES PATENT OFFICE.

WALTER A. WOOD, OF HOOSICK FALLS, NEW YORK.

IMPROVEMENT IN GUARD-FINGERS FOR HARVESTERS.

Specification forming part of Letters Patent No. 15,264, dated July 1, 1856; Reissue No. 1,460, dated April 21, 1863.

DIVISION B.

*To all whom it may concern:*

Be it known that I, WALTER A. WOOD, of Hoosick Falls, in the county of Rensselaer and State of New York, have made certain new and useful Improvements in Guards or Fingers for Harvesting-Machines; and I do hereby declare that the following is a full, clear, and exact description of the same, reference being had to the accompanying drawings, making a part of this specification, in which—

Figure 1 represents a side view of a guard and an end view or section of a finger-bar, and Fig. 2 represents a side view of the guard detached from the finger-bar.

To allow the cut grass to readily pass over the finger-bar, the shear-edges of the guards must be raised up to allow the grass to freely pass over it. The guards, for lightness and strength, convenience, and for rigidity, are secured to the under side of the finger-bar, which is made of a bevel or inclined shape, and the shear-edges to allow the cut grass to freely pass over the finger-bar should be raised up near the top of the bar, or a line passing over the bar. To so fasten the guards to the under side of the finger-bar having a bevel or inclined form to readily ride over the ground and to raise up their shear-edges to near the top of the finger-bar, or to a line passing over the top of said bar, is the object and purpose of this part of my invention.

The most approved way of fastening guard-fingers to the finger-bar is to attach them to the bottom of the finger-bar, which is the opposite side to where the shear or cutting edges of the guards should be, so that said bar may not present an obstruction to the passing back of the cut grass as the machine advances. The front edge of the finger-bar, which is the edge that comes in contact with the stubble as the machine is drawn forward, should be of a bevel or inclined form by planes or otherwise, the object being twofold—viz., first, to facilitate the passage of the machine over the cut stubble and to avoid such resistance to its easy passage as a square or more obtuse-angled edge of the front of the bar would offer; second, guards thus fastened to the under side of the finger-bar, and having their cutting-edges at or near a line with the top of said bar, will be of much greater strength with a given amount of metal, and much less liable to break by coming in contact with a stone or other obstruction, as it has the angular or bevel or inclined form to break the sudden elevation which there would otherwise be between the rear portions of the guards and their raised-up shear-edges.

To enable others skilled in the art to make and use my invention, I will proceed to describe the same with reference to the drawings.

A is a guard, whose cutting or shear edge is represented at *a*. *b* is the cap of the guard, which extends back as far, or nearly so, as the cutting-edges of the knife, the edges of which are on a plane with the cutting-edges of the guard. The rear portion, B, of the guard, or that portion which comes in contact with the under side of the finger-bar C, is much lower than the shear-edge *a* of the guard, so that while the guard is fastened to the under side of the finger-bar the shear-edge of the finger may be up near the top of the bar, or a line passing over the bar. To break the sudden elevation of the shear-edge above the portion B, I use the four planes 1 2 3 4 on the guard and make the front of the finger-bar of such shape as will snugly fit against these planes, as shown in the drawings, and which give a much more secure bearing to the guards on the finger-bar than a more abrupt elevation would do, and admits of making a strong guard-finger with a reduced quantity of metal. Making the front of the finger-bar of a bevel or inclined form and the giving to those parts of the guards that bear against this part of the bar a similar form enable me to get many advantages in a cutting apparatus not heretofore attained.

Having thus fully described the purpose and object of this part of my invention, what I claim under this patent is—

1. A finger or guard recessed or dropped off so as to be fastened to the under side of the finger-beam, which has a bevel or inclined form, or is similarly dropped off, while its shear or cutting edge is raised up near the top of said bar, or to a line passing over the bar, for the purpose of allowing the cut grass to readily pass over the finger-bar, substantially as described.

2. As a means of making the elevation of the shear-edge above the base or heel of the finger or guard and of affording a bearing for the finger-bar and for the sickle or cutters, the four planes 1 2 3 4, substantially as described and represented.

WALTER A. WOOD.

Witnesses:
ADIN THAYER, Jr.,
JAMES S. THAYER.